L. B. HARRIS.
STOP VALVE.
APPLICATION FILED DEC. 13, 1916.

1,414,357. Patented May 2, 1922.

Inventor,
Leonard B. Harris.
By his Attorneys,
Meyers, Cushman & Rea

UNITED STATES PATENT OFFICE.

LEONARD B. HARRIS, OF PHILADELPHIA, PENNSYLVANIA, ASSIGNOR TO HARRIS PATENTS COMPANY, OF NEW YORK, N. Y., A CORPORATION OF DELAWARE.

STOP VALVE.

1,414,357.  Specification of Letters Patent.  Patented May 2, 1922.

Application filed December 13, 1916. Serial No. 136,658.

*To all whom it may concern:*

Be it known that LEONARD B. HARRIS, a citizen of the United States, residing at Philadelphia, in the county of Philadelphia and State of Pennsylvania, has invented certain new and useful Improvements in Stop Valves, of which the following is a specification.

My present invention relates to improvements in stop valves, relating more particularly to valves of this type adapted to operate in connection with high pressures.

The conditions present in high-pressure installations, and especially those involved in the use of air, are such as to place controlling valve structures under exceedingly heavy strains. For instance, the air pressures present in installations of Diesel engines are so high as to require the use of special forms of valves, the valves in commercial use being unable to satisfactorily meet the conditions of service, being unable to withstand the high pressures developed which may at times reach operating pressures as high as 1000 pounds.

To meet these conditions I have designed a structure in which the packing is of such form and so arranged and positioned as to render the valve leakage-proof even under these onerous conditions.

Another difficulty presented in valves employed for this purpose, as well as with valves operating in systems of lower pressures, is the tendency of the operator to increase the movement of the valve stem or spindle to such an extent as to place strains thereon or affect the leakage-resistance qualities of the valves. Such extended movements are especially harmful where the packing structures are so positioned that the valve stem may move to a point where the packing elements become more or less ineffective. This objection is met by the use of a fixed stop which limits the length of movement of the valve from its seat in such manner as to maintain the integrity of the packing structure and prevent the application of strains to the operating parts.

Another feature present in high pressure installations, and especially in air-controlling valves, is the necessity for forcing a tight seating of the valve. Consequently the valve manipulation is provided with increased pressure, as by so increasing the power leverage as to force the desired condition. As there is a tendency of the valve and seat to bind under these conditions, it is often necessary to provide a forcible starting of the valve from its seat, the resistance at times being such that even increased leverage is insufficient to produce the result, and it becomes necessary to hammer the valve to sufficiently loosen this binding action as to enable the unseating movements to take place. In the present invention this objection is met by providing a structure in which the parts are so arranged as to permit the hammer action to be obtained at will, the elements essential for this purpose being present as a part of the operating mechanism, no additional means being required, the parts employed for this purpose forming elements required in moving the valve to and from its seat, so that the operator is free to employ the structure for this purpose whenever it is found necessary.

Other objects are the provision of a structure which is simple and efficient in operation, durable in construction, and which can be manufactured and maintained at a relatively low cost.

The invention consists in the improved construction, combination and arrangement of parts hereinafter fully described, illustrated in the accompanying drawings and more particularly pointed out in the appended claims.

In the accompanying drawings, in which reference characters indicate similar parts in each of the views,—

Figure 1:
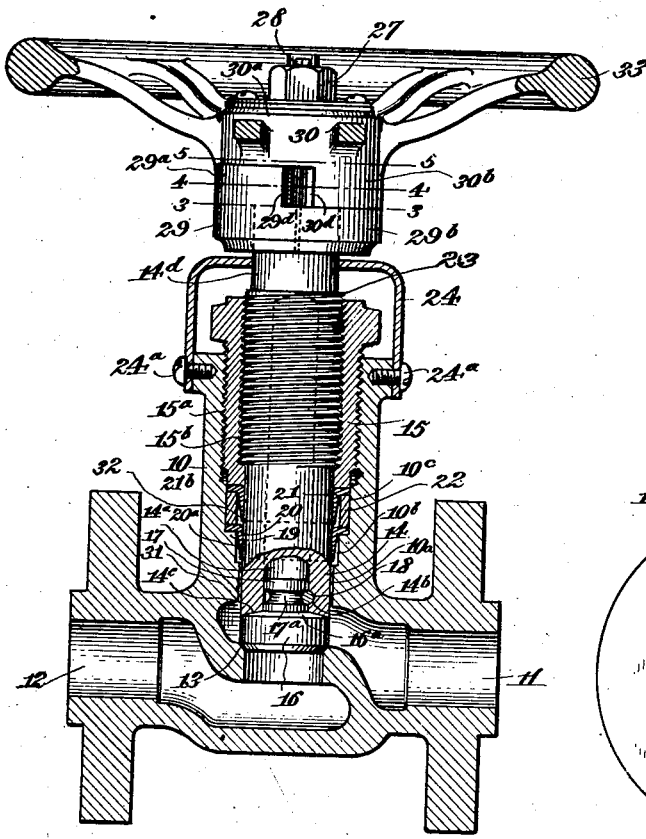
Figure 1 is a central longitudinal view of a valve constructed in accordance with my invention, parts being shown in elevation, the valve being shown as seated.
Figure 2:
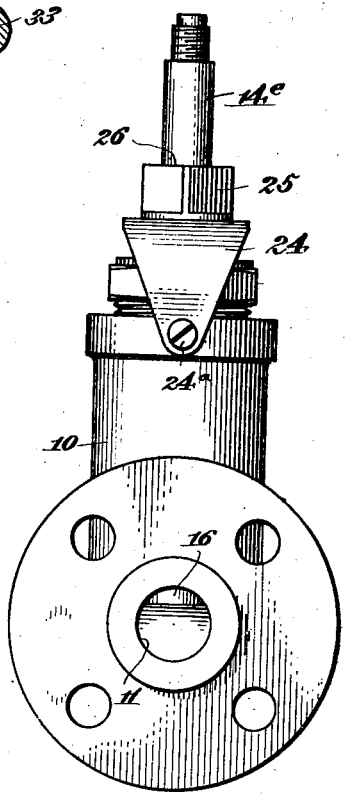
Figure 2 is an end elevation of the same with the operating wheel removed.
Figure 3:
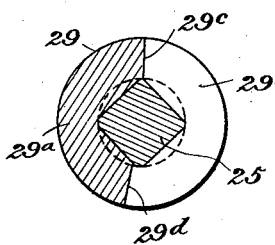
Figure 4:
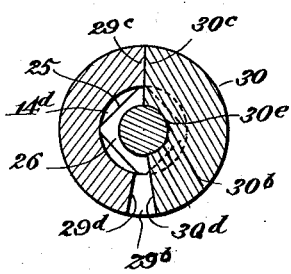
Figure 5:
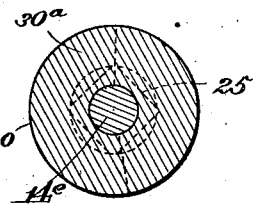

Figures 3, 4 and 5 are sectional views taken respectively on lines 3—3, 4—4 and 5—5 of Figure 1.

10 designates the valve body having inlet and outlet ports 11 and 12 respectively. As the valve is adapted to operate in connection with exceedingly high pressures, the form shown in the drawing being designed for operation under pressures of 1000 pounds and upwards, the body is necessarily of massive construction. For instance, the valve of the drawing is shown as drawn to scale, the ports 11 and 12 being 1½" in diameter.

The valve being of the stop type, has its valve seat, indicated at 13, axially alined with the axis of the valve stem or spindle 14, the latter being threaded to a bushing or gland 15 presently referred to. The spindle is preferably formed hollow, this being indicated in the form of a recess 14ª.

Valve 16 is formed with a stem 17 fitting within the recess 14ª, said stem carrying an annular groove 17ª by means of which the valve is secured to the spindle, a pin 18 extending into said groove 17ª and an opening 14ᵇ formed in the spindle, the pin extending tangential to the groove. The spindle has its inner end somewhat dished, as at 14ᶜ, the valve having a face 16ª complemental to the end 14ᶜ. This arrangement provides a secure retaining device for the valve, without, however, preventing relative rotative movement between the valve and spindle. Hence, the seating and unseating movements of the valve may be had without producing a grinding action between the valve face and the seating face, a material advantage where the seating pressures are high, as in installations of the character referred to.

As shown, the valve is of a diameter substantially equal to that of the lower portion of the spindle.

The spindle receiving bore of the valve body is of different diameters, the flange-like portion of smallest diameter indicated at 10ª being at the lower or inner end of the bore and having a slightly greater diameter than that of the valve and spindle, thereby forming an annular channel or passageway 31 therebetween. The bore, above portion 10ª, is increased in diameter as at 10ᵇ, and is then still further increased in diameter, as at 10ᶜ, forming a shoulder 19 on which is mounted packing element 20, preferably of leather, shaped substantially as shown, the sleeve-like portion 20ª preferably having a tapering wall, a somewhat flexible construction which will tend to maintain a proper packing condition. By reason of the tapering of portion 20ª air which may enter through channel 31 will act to more firmly press the packing sleeve 20ª against the spindle.

21 designates a second packing element (a substantial duplicate of element 20), elements 20 and 21 being spaced apart by a ring 22. The packing structure is completed by bushing or gland 15 which is externally threaded, as at 15ª, for connection with the valve body and internally threaded, as as 15ᵇ, to receive the threaded portion of spindle 14.

As will be seen, packing elements 20 and 21 are clamped in position between shoulder 19 and the inner end of gland 15, being secured in position by the inward threading movement of the gland. This threading movement causes flange 20ᵇ to be clamped between shoulder 19 and ring 22, while flange 21ᵇ of element 21 is clamped between ring 22 and the inner end of the gland, the annular space which receives the sleeve-like portions of the packing elements forming a pocket indicated generally at 32. As a result, the gland may be threaded inwardly sufficient to apply considerable pressure to the flanges of the packing elements without in any way affecting the flexibility which the tapering formation gives to the packing sleeves; this threading movement may be sufficient to bind the bushing or gland to retain it in its adjusted position without the use of any additional means for this purpose, the bushing remaining in such position during threading movements of the spindle to seat and unseat the valve. As will be seen, ring 22 acts to space the two packing elements in the direction of length of the spindle.

As will be apparent from Figure 1, leakage of air through annular channel 31 heretofore referred to, will tend to press the sleevelike portion of the packing 20 more firmly to the surface of the spindle, but any leakage that might possibly take place past element 20, passes into the annular space between the two packing elements where it also acts to press the sleeve-like portion of element 21 into contact with the spindle. Should the air, under the high pressures pass through this double barrier provided by the pair of packing elements, it must then pass through the threaded connection between the bushing and the spindle, which connection is of considerable length. Obviously, the clamping action of the bushing on the flanges of these packing elements serves to prevent leakage around such flanges. As a result, the packing structure will hold the pressures within the pipe line even though these pressures reach the amplitude above indicated.

Spindle 14 is preferably reduced in diameter, as at 14ᵈ, beyond the threaded portion, thus forming a shoulder 23, said shoulder being adapted to co-act with a yoke 24 through which this reduced portion extends. Yoke 24 is preferably removably secured to body-portion 10, as by screws 24ª. Said yoke acts as a stop to limit the movement of the valve and spindle, and is positioned to prevent movement of the spindle to an extent which might bring the inner face of the valve beyond the outer plane of the face of portion 10ª, thus practically maintaining a constant cross-section of the annular channel for passageway 31 at least for the portion of its length in advance of the pocket within which the packing elements lie.

By this arrangement a portion of pocket 32 will remain in open communication with the inlet port through channel 31, but since the latter is relatively small in cross section, variations in pressure such as may occur in the inlet port when the valve is opened or closed, are not made effective in the pocket as rapidly as in the inlet, since shifting of the air from and to the pocket must be through this channel. Consequently the pressures within the pocket tend to remain more constant and less liable to disturb the desired relation between the packing elements and the spindle, and hence the packing elements are substantially free from the disturbing factors which sudden variations in pressure may provide.

Portion 14$^d$ of the spindle, beyond stop 24, is preferably formed angular, or of non-circular configuration, as at 25 (the drawing showing the structure as of square form with the corners cut away), a shoulder 26 being produced at the outer end of the square portion by reducing the diameter of the spindle, as at 14$^e$. The squared portion 25 and portion 14$^e$ are adapted to receive the rotating structure for the valve, this structure being secured in position by a detachable securing mechanism such for instance as a nut 27. If desired, a pin 28 may be employed to retain the nut in position.

The rotating mechanism is in the form of an element 29 and a member 30 adapted to co-operate in providing the rotation.

Element 29 is sleeve-like, as at 29$^a$, for a portion of its length, the sleeve portion having its bore complemental to the non-circular portion 25 of the spindle. Above the sleeve-like portion 29$^a$ element 29 is provided with an extension 29$^b$ which has its outer face as a continuation of the peripheral face of portion 29$^a$, but which has its peripheral length less than half the length of the similar length of portion 29$^a$. The inner face of the extension extends on two planes corresponding to two radii of the member, thereby forming two faces 29$^c$ and 29$^d$, these faces being joined by a curved face. Face 29$^c$ is inclined relative to the plane of face 29$^d$, as shown in Fig. 3. Element 29 is supported on the shoulders formed at the base of the faces forming squared portion 25.

Member 30 is also formed with a sleeve-like portion 30$^a$ having a bore loosely fitting portion 14$^e$ of the spindle. the lower face of member 30 being adapted to rest on the upper face of extension 29$^b$, on shoulder 26, or on both. Said member also carries an extension 30$^b$ which, like extension 29$^b$, has a peripheral length less than half the similar length of portion 30$^a$. The inner face of extension 30$^b$ is formed with faces 30$^c$ and 30$^d$ joined by the curved face 30$^e$, the latter having its curvature on a radius corresponding to the member bore. Member 30 also carries a wheel 33 by means of which the valve is manipulated.

Faces 29$^c$ and 30$^c$ oppose each other as do faces 29$^d$ and 30$^d$, the arrangement being such that when the parts are assembled, a lost motion structure is presented. As will be understood, the spindle may be rotated by rotation of wheel 33. One set of opposing faces is active during such rotation, depending upon the direction in which rotation is had. If the movement is to seat the valve, the leverage produced by the wheel will permit a considerable pressure to be exerted for this purpose. Should it be desired to increase the effect, the movement of wheel 33 may be reversed to separate the previously contacting faces, leaving the valve in position, but producing a structure for imparting a hammer blow to the spindle by again reversing the direction of movement of the wheel, thus causing the faces to again contact forcibly and produce a hammer blow. If the valve is found to stick, when unseating action is to be had, the spindle can be subjected to hammer blow action to release it through manipulation of the wheel movements in an obvious manner. As the hammer blow may be imparted in either direction, no other means need be employed for increasing the leverage. Hence, all essential parts of the mechanism are present to meet the different conditions and in a form to produce the most efficient action.

As will be seen, the length of the threaded connection between the spindle and bushing is such as to maintain the spindle against wabbling, and, by reason of the relatively large diameter of the lower or inner end of the spindle liability of a springing action is eliminated.

By mounting the spindle in the bushing or gland with a threaded connection and also threading the bushing to the valve body, an efficient packing-setting structure is had and at the same time leakage from the pocket from either side of the packing elements is obstructed by the extended threaded connections, effectively preventing leakage of air even under the high pressures contemplated.

While I have herein shown and described a preferred way in which the invention may be carried into effect, it is to be understood that the same may be employed in connection with other uses and that changes and modifications therein may be made as required or desired to meet the exigencies of use. I therefore desire to be understood as reserving the right to employ the structure in any use for which it is applicable and to make any and all changes and modifications therein as the exigencies of use may necessitate, in so far as the same may fall within the spirit and scope of the invention as expressed in the accompanying claims.

What I claim is:—

1. In a high pressure hydraulic valve, a valve body having a valve seat and a spindle bore, a valve spindle passing through the bore, a valve member on the spindle cooperating with the seat, the body having a packing recess surrounding the spindle, a rigid unyielding annular packing support in the recess, a packing member comprising a tapered sleeve located in the recess, engaging the spindle and permanently spaced from the walls of said recess and support, a flange resting on the annular support, a rigid spacing ring resting on the packing flange and spaced away from the spindle, another similar packing member located in the recess having its sleeve engaging the spindle and its flange resting on the spacing ring, and a bushing engaging the valve body and the flange of the last mentioned packing member, and locking the packing members and spacing ring in position.

2. In a high pressure hydraulic valve, a valve body having a valve seat and a spindle bore, a valve spindle passing through the bore, a valve member on the spindle cooperating with the seat, the body having a packing recess surrounding the spindle, and an integral shoulder in the recess, a packing member comprising a tapered sleeve located in the recess engaging the spindle and permanently spaced from the walls of said recess and the shoulder, and a flange resting on the shoulder, a rigid spacing ring resting on the packing flange and spaced away from the spindle, another similar packing member located in the recess and having its sleeve engaging the spindle and its flange resting on the spacing ring, and a bushing engaging the valve body and also engaging the flange of the last mentioned packing member and locking the packing members and spacing ring in position.

3. In a valve adapted for operation under continuous high-pressure conditions and in combination, a valve body having inlet and outlet ports with a valve seat therebetween, a threaded spindle carrying the valve, said valve body and spindle being complementally formed to provide an annular pocket intermediate the valve and threaded portion of the spindle, packing elements having sleeve-like portions adapted to contact the spindle within said pocket, and means for clamping said elements in spaced relation in the direction of length of the spindle and with a packing element in permanently-open communication with the flow path through said ports, said means including a member having a threaded connection with the spindle.

4. In a valve adapted for operation under continuous high-pressure conditions and in combination, a valve body having inlet and outlet ports with a valve seat therebetween, a threaded spindle carrying the valve, said valve body and spindle being complementally formed to provide an annular pocket intermediate the valve and threaded portion of the spindle, packing elements having sleeve-like portions adapted to contact the spindle within said pocket, means for spacing said elements to provide individual contact of said sleeve-like portions at successive points in the direction of length of the spindle, and means for clamping said elements in such positions and with a packing element in permanently-open communication with the flow path through said ports, said means including a bushing or gland threaded to the valve body and having a threaded connection with the spindle.

5. In a valve adapted for operation under continuous high-pressure conditions and in combination, a valve body having inlet and outlet ports with a valve seat therebetween, a threaded spindle carrying a valve, means for threading the spindle to move the valve to and from its seat, said spindle having a shoulder and having its threads positioned between the shoulder and valve, and a yoke carried external by the body and co-operating with said shoulder to limit the length of movement of the valve from its seat.

6. In a valve of the character described and in combination, a valve body having inlet and outlet ports with a valve seat therebetween, a threaded spindle carrying a valve, a pocket between the spindle and the body and adapted to receive packing, said pocket being in open communication with the inlet port through a restricted channel of definite cross section, means for rotating said spindle to move the valve to and from its seat, and means for limiting the length of valve movement from its seat to maintain the cross sectional area of said channel.

7. In a valve of the character described and in combination, a valve body having inlet and outlet ports with a valve seat therebetween, a threaded spindle carrying a valve, and means carried by the spindle for rotating it to move the valve to and from its seat, said means including a pair of superposed axially-alined members mounted on the spindle and having opposing faces adapted to co-act during rotational movement of the spindle, said spindle and one of said members having their contacting faces complemental to each other and of non-circular contour.

8. In a valve of the character described and in combination, a valve body having inlet and outlet ports with a valve seat therebetween, a threaded spindle carrying a valve, and means carried by the spindle for rotating it to move the valve to and from its seat, said means including a pair of superposed axially-alined members mounted on the spindle and having opposing faces adapted to co-act during rotational movements of the spindle, said spindle and one of said members having their contacting faces complemental to each other and of non-circular contour, said faces being relatively positioned to produce a lost motion relation between the members, 9. In a valve of the character described and in combination, a valve body having inlet and outlet ports with a valve seat therebetween, a threaded spindle carrying a valve, and means carried by the spindle for rotating it to move the valve to and from its seat, said means including a pair of superposed axially-alined members mounted on the spindle and having opposing faces adapted to co-act during rotational movements of the spindle, said spindle and one of said members having their contacting faces complemental to each other and of non-circular contour, said faces being relatively positioned to produce a lost motion relation between the members to permit a hammer-blow action to be applied to the spindle at will.

10. In a valve of the character described and in combination, a valve body having inlet and outlet ports with a valve seat therebetween, a threaded spindle carrying a valve, said spindle having a shoulder and also having a non-circular external configuration adjacent the shoulder, and means carried by the spindle to move the valve to and from its seated position, said means including an element contacting with said shoulder and having a bore complemental to said non-circular configuration, and a member axially-alined with such element and having a circular bore, said element and member each having extensions of a peripheral length less than the similar length of the element or member, each extension also having a pair of faces extending on radial planes, said faces being paired in opposed relation, whereby said member may be moved relatively to the element with a lost motion effect.

In testimony whereof I affix my signature.

LEONARD B. HARRIS.